(12) United States Patent
Sekiguchi et al.

(10) Patent No.: US 7,765,395 B2
(45) Date of Patent: *Jul. 27, 2010

(54) OPERATING SYSTEM REBOOTING METHOD AND APPARATUS FOR CONTINUING TO EXECUTE A NON-STOP MODULE EVEN DURING REBOOTING

(75) Inventors: Tomoki Sekiguchi, Yokohama (JP); Toshiaki Arai, Machida (JP)

(73) Assignee: Hitachi, Ltd., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 12/107,651

(22) Filed: Apr. 22, 2008

(65) Prior Publication Data

US 2008/0201573 A1 Aug. 21, 2008

Related U.S. Application Data

(63) Continuation of application No. 10/861,482, filed on Jun. 7, 2004, now Pat. No. 7,373,496, which is a continuation of application No. 09/858,492, filed on May 17, 2001, now Pat. No. 7,069,430, which is a continuation of application No. 09/107,388, filed on Jun. 30, 1998, now Pat. No. 6,253,320.

(30) Foreign Application Priority Data

Jul. 2, 1997 (JP) .................................. 9-191840

(51) Int. Cl.
*G06F 9/00* (2006.01)
(52) U.S. Cl. .......................................... 713/2; 710/48
(58) Field of Classification Search ...................... 713/2; 710/48

See application file for complete search history.

(56) References Cited

U.S. PATENT DOCUMENTS

| | | | |
|---|---|---|---|
| 5,386,552 A | 1/1995 | Garney | |
| 5,469,571 A | 11/1995 | Bunnell | |
| 5,513,319 A | 4/1996 | Finch et al. | 714/55 |
| 5,594,903 A | 1/1997 | Bunnell | |
| 5,708,820 A | 1/1998 | Park et al. | 713/323 |
| 5,903,752 A | 5/1999 | Dingwall et al. | |

(Continued)

FOREIGN PATENT DOCUMENTS

JP 59140568 8/1984

(Continued)

OTHER PUBLICATIONS

Bill Carpenter, et al "The RTX Real-Time Subsystem for Windows NT", USENIX Windows NT Workshop, Aug. 11-13, 1997, pp. 33-37.

(Continued)

*Primary Examiner*—Albert Wang
(74) *Attorney, Agent, or Firm*—Brundidge & Stanger, P.C.

(57) ABSTRACT

A method of rebooting an operating system including a plurality of load modules in a single computer. One load module which is to be operated during rebooting of the operating system is held in a memory, while establishing a state capable of accepting interrupt to be processed by the one load module. All the other load modules are loaded in a memory of the computer. Processing of the interrupt can be executed by the one load module even during the rebooting of the operating system.

14 Claims, 11 Drawing Sheets

110

| 601 | 602 | 603 |
|---|---|---|
| LOAD MODULE NAME | FILE NAME | NON-STOP MODULE FLAG |
| REBOOT LOADER | | ✓ |
| DEVICE DRIVER #1 | DRIVER1 | ✓ |
| DEVICE DRIVER #2 | | |
| | | |

U.S. PATENT DOCUMENTS

| | | |
|---|---|---|
| 5,935,242 A | 8/1999 | Madany et al. |
| 5,948,112 A | 9/1999 | Shimada et al. |
| 5,951,686 A | 9/1999 | McLaughlin et al. |
| 5,991,822 A | 11/1999 | Mealey et al. |
| 5,995,745 A | 11/1999 | Yodaiken |
| 6,253,320 B1 | 6/2001 | Sekiguchi et al. |
| 6,529,966 B1 | 3/2003 | Willman et al. ............... 710/10 |
| 7,069,430 B2 | 6/2006 | Sekiguchi et al. |

OTHER PUBLICATIONS

Dave Cresta, "Reliable Control with Windows NT", Proceedings of Real-Time Computer Show & Conference, 1998, pp. 1-8.

FIG.5

| 501 NON-STOP MODULE NAME | 502 TEXT SEGMENT ADDRESS | 503 TEXT SEGMENT SIZE | 504 DATA SEGMENT ADDRESS | 505 DATA SEGMENT SIZE | 506 RESOURCE USAGE INFORMATION | 507 REINITIALZE ROUTINE |
|---|---|---|---|---|---|---|
| REBOOT LOADER | | | | | | |
| DEVICE DRIVER #1 | 508 | 509 | 510 | 511 | 512 | 513 |

| LOAD MODULE NAME | FILE NAME | NON-STOP MODULE FLAG |
|---|---|---|
| REBOOT LOADER | | ✓ |
| DEVICE DRIVER #1 | DRIVER1 | ✓ |
| DEVICE DRIVER #2 | | |
| | | |

| | |
|---|---|
| TEXT SEGMENT OFFSET | 701 |
| TEXT SEGMENT SIZE | 702 |
| DATA SEGMENT OFFSET | 703 |
| DATA SEGMENT SIZE | 704 |
| INITIALIZE ROUTINE OFFSET | 705 |
| RELOCATE DATA OFFSET | 706 |
| RELOCATE DATA SIZE | 707 |
| TEXT | 708 |
| DATA | 709 |
| RELOCATE DATA | 710 |

700

OPERATING SYSTEM REBOOTING METHOD AND APPARATUS FOR CONTINUING TO EXECUTE A NON-STOP MODULE EVEN DURING REBOOTING

CROSS-REFERENCED TO RELATED APPLICATIONS

The present application is a continuation of application Ser. No. 10/861,482, filed Jun. 7, 2004 now U.S. Pat. No. 7,373,496; which is a continuation of application Ser. No. 09/858,492, filed May 17, 2001, now U.S. Pat. No. 7,069,430; which is a continuation of application Ser. No. 09/107,388, filed Jun. 30, 1998, now U.S. Pat. No. 6,253,320, the contents of which are incorporated herein by reference.

BACKGROUND OF THE INVENTION

The present invention relates generally to a method of rebooting an operating system in a computer or a computer system. More particularly, the invention is concerned with a method of rebooting an operating system when it halts or stops due to occurrence of software failure.

In some operating system, device driver modules designed for controlling hardware connected to a computer are provided separately from the kernel. The device driver module called for by the kernel is used by loading it from a secondary storage such as a magnetic disk storage or the like. In conjunction with the operating system imparted with the function mentioned above, it is known to enable the computer to control a timing-critical system (i.e., system imposed with severe restriction with regard to the timing) by making use of a real-time processing device driver which is designed to snatch a clock interrupt from the operating system. To say in another way, the clock interrupt which is intrinsically to be accepted by the operating system is snatched by the real-time processing device driver for thereby executing the relevant real-time processing with priority over the processing of the operating system. After the execution, control is transferred back to the operating system.

As a concrete example of such system or scheme, there may be mentioned one described in an article entitled "The RTX Real-Time Subsystem for Windows NT": USENIX Windows NT Workshop, Aug. 11-13, 1997, pp. 33-37. According to this known scheme, interrupt issued to an operating system by a device destined for the real-time control is snatched by modifying some module of the operating system and by using an especial device driver, whereon the processing for the interrupt as snatched is executed by a program which is irrelevant to the operating system. By virtue of such arrangement, the interrupt can be processed independent of the operating system, whereby the real-time performance of the computer is enhanced.

In the real-time processing, it is equally important to ensure high reliability. In the case of the known system mentioned above, the real-time processing module is designed to be independent of the kernel of the operating system. Accordingly, the real-time processing can be executed continuously even when the operating system halts or stops due to occurrence of some software failure. Furthermore, when the operating system stops due to the software failure, this fact is notified to the real-time processing module. Thus, the real-time processing module can execute a processing for coping with the stoppage of the operating system. In the known system disclosed in the above literature, the processing for the interrupt issued by the device destined for the real-time control is so controlled that execution of the interrupt processing can be continued regardless of stoppage of the operating system due to occurrence of failure.

However, in the conventional systems known heretofore, inclusive of the system mentioned above, the real-time processing device driver is caused to stop when the operating system having stopped due to occurrence of software failure is rebooted. In other words, the conventional system suffers a problem that the processing for rebooting the operating system can not be executed simultaneously with the real-time processing. This can be explained by the fact that upon rebooting of the operating system, the relevant processor is reset, whereby the data required for the virtual address translator and the data for the interrupt processing will be lost. The problem mentioned just above is more serious in the system incorporating hardware which has to be controlled periodically at a very short time interval without being stopped, because the control of such hardware will be suspended by the operating system rebooting operation. In this conjunction, it should also be mentioned that in the conventional systems, the operating system can not accept not only the clock interrupt but also the external interrupt issued by the hardware so long as the operating system is being rebooted.

By way of example, let's suppose a computer system of cluster configuration including a plurality of computers. In such system, one of the computers issues inquiry for operation of other computers periodically at a predetermined interval. In case no response is issued from any one of the computers over a predetermined time span or period, it is then decided that the computer issuing no response stops, whereon a processing for modifying or altering the system configuration is executed. In that case, the decision that the computer is not operating can be made only after lapse of a predetermined waiting time. In this conjunction, it will be noted unless the interrupt processing can be executed during rebooting of the operating system, a longer time will have to be set as the waiting time mentioned above. Thus, lots of time is taken for starting the reconfiguration of the computer system, giving rise to a problem. As can readily be appreciated, if the external interrupt for the inquiry such as mentioned above can be accepted with the response being sent back even in the course of rebooting the operating system, the time mentioned above can be reduced, which in turn means that the time taken for starting the reconfiguration of the computer system can be shortened.

It should additionally be mentioned that the rebooting method known heretofore requires a lot of time for allowing the operating system to start operation thereof because such processings as memory check, verification of the hardware configuration and others have to be executed, incurring a problem as well.

SUMMARY OF THE INVENTION

In the light of the state of the art described above, it is an object of the present invention to provide an operating system rebooting method which allows the processing for the external interrupt to be executed independent of the operating system even during the reboot operation therefor.

In view of the above and other objects which will become apparent as the description proceeds, there is provided according to an aspect of the present invention an operating system rebooting method for rebooting an operating system having stopped upon detection of a software failure, wherein a load module which is to be operated during rebooting of the operating system is held in a memory while setting up such state that external interrupt to be processed by the load module can be accepted. On the other hand, the other load modules than that mentioned above are loaded in the interrupt disable or inhibit state for any other interrupt than the external interrupt mentioned above.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 5 is a view showing schematically a data structure for managing non-stop modules;

FIG. 6 is a view showing schematically a module configuration file which can be used in carrying out the method according to the present invention;

FIG. 7 is a view showing schematically a load module file in which a load module is stored;

DESCRIPTION OF THE PREFERRED EMBODIMENTS

Figure 1:
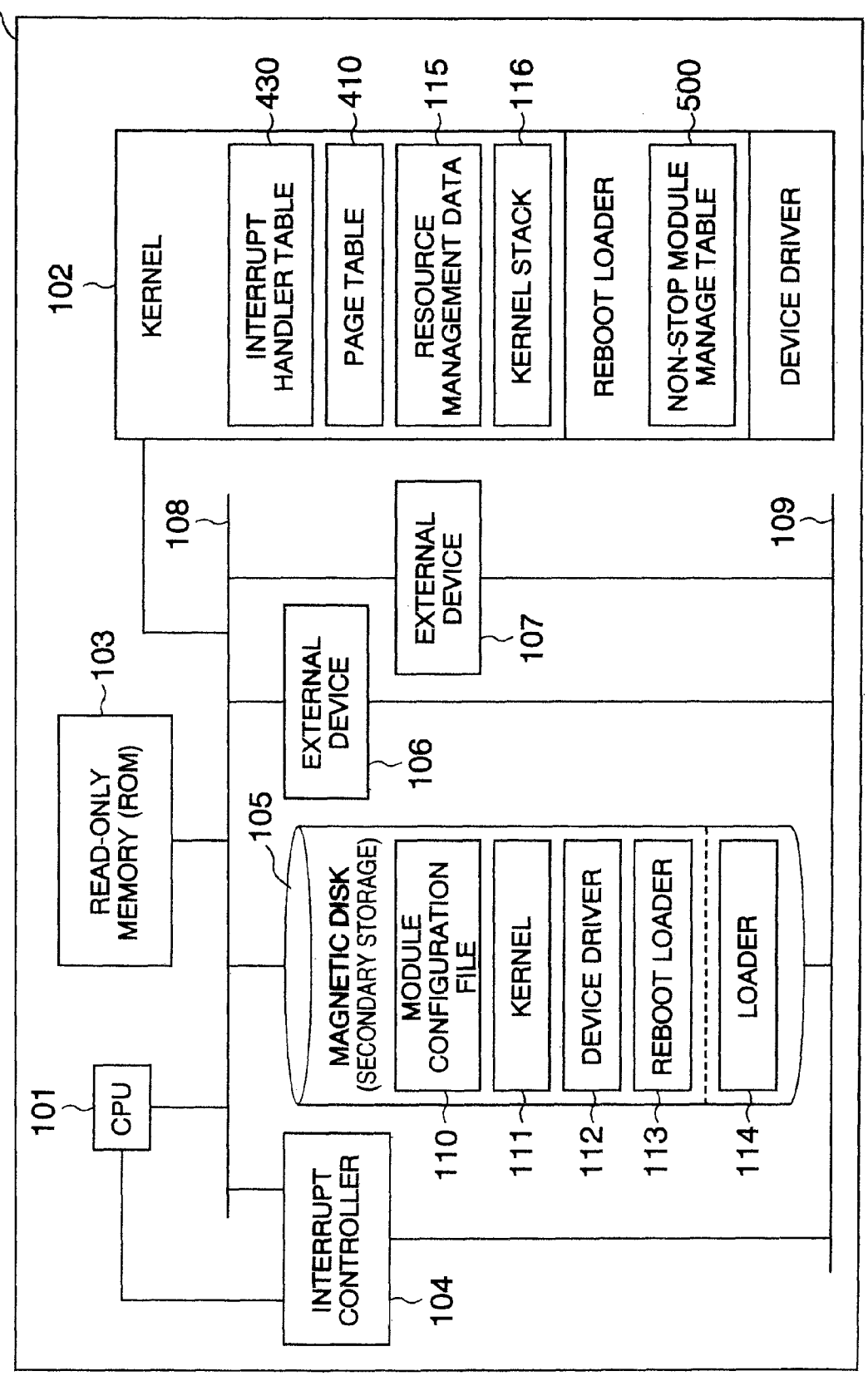
FIG. 1 is a block diagram showing schematically a structure of a computer to which the present invention can be applied.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing schematically a structure of a computer to which the present invention can find application. Referring to the figure, a computer generally denoted by reference numeral 100 is comprised of a processor 101, a main memory 102, a read-only memory (ROM) 103, a magnetic disk (secondary storage) 105, external devices 106 and 107, an interrupt controller 104, a bus 108 for interconnecting individual components, and an interrupt line 109.

Stored in the read-only memory 103 is an initialize program designed for executing an initialize processing for the computer, wherein the initialize program is located at an address to which control transits when the processor 101 is reset. The program stored in the read-only memory 103 serves to structurize the data representing a hardware configuration in the main memory 102. Further, data located in a predetermined area or region of the magnetic disk (secondary storage) 105 is loaded to the main memory 102 to be transferred to the control with the data being regarded as program. In the case of the instant embodiment of the invention now under consideration, a loader 114 resident in a predetermined region of the magnetic disk 105 is loaded into the main memory 102 to be executed.

The loader 114 taken over the processing loads a kernel 111 into the main memory and sets up an address translation mechanism for the processor 101, whereon the processor is caused to transit to a virtual addressing mode to execute the kernel 111. At that time, the loader transfers the hardware configuration data to the kernel 111. In response, the kernel 111 executes the initialize processing for the hardware devices managed by the kernel 111 by consulting the hardware configuration data. Program modules separated from the kernel 111 in accordance with the contents of a module configuration file 110 are loaded to the main memory 102 for executing the initialize processings for the individual modules, respectively. Assuming, by way of example, that the module configuration file 110 contains the statement to the effect that a reboot loader 113 and a device driver 112 are to be loaded, then the kernel 111 loads the reboot loader 113 and the device driver 112 to the main memory to execute the initialize routines for the reboot loader 113 and the device driver 112, respectively. In FIG. 1, it is shown that the kernel 111, the reboot loader 113 and the device driver 112 have been loaded. Finally, the kernel 111 generates a first process, whereupon the computer starting or activating procedure comes to an end.

When the operating system kernel 111 has stopped due to occurrence of a software failure in the computer system as mentioned above, then the processor is reset and the operating system is rebooted through the procedure described above. In that case, during the period in which the rebooting procedure is being carried out, the virtual addressing mode is cleared, making it impossible to accept the interrupt from the external devices 106 and 107. In this conjunction, it is presumed that the interrupt issued by the external device 106 has to be processed even during the period in which the kernel 111 has stopped due to a software failure and is being rebooted, and that the interrupt issued by the external device 106 is managed by the device driver 112. With the present invention, it is contemplated to provide a rebooting procedure which is capable of accepting a particular interrupt and executing the interrupt processing in continuation even during the period in which the rebooting procedure is being carried out for the kernel 111.

The device driver 112 is a module which is so programmed as to process the interrupt of the external device 106 without making use of the services offered by the kernel 111. In the case of the system now under consideration, the device driver 112 is registered as a non-stop module in a non-stop module manage table 500 of the reboot loader 113. The reboot loader 113 is a module which is executed for rebooting the kernel 111 when it has stopped upon occurrence of a software failure. More specifically, the reboot loader 113 is designed to execute the processing for rebooting the kernel 111 while sustaining the processing environments for the modules registered in the non-stop module manage table 500 as the non-stop modules.

Parenthetically, the phrase "processing environments of the non-stop modules" means comprehensively the states of the virtual addresses where the non-stop modules are located, the address translation table therefor, physical memory in which the modules are stored and the interrupt handler for the interrupts to be processed by the non-stop modules. The address translation table is set up in a page table 410 while the interrupt handler is set up in an interrupt handler table 430. Further, address space information and hardware resource information are stored as resource management data 115.

The reboot loader 113 performs reloading of the kernel 111 and execution thereof by consulting the non-stop module manage table 500 while holding intactly the address region secured by the non-stop modules and the set-up of the interrupt handler. In this way, continuity of the interrupt processing of the non-stop module can be sustained.

Figure 2:
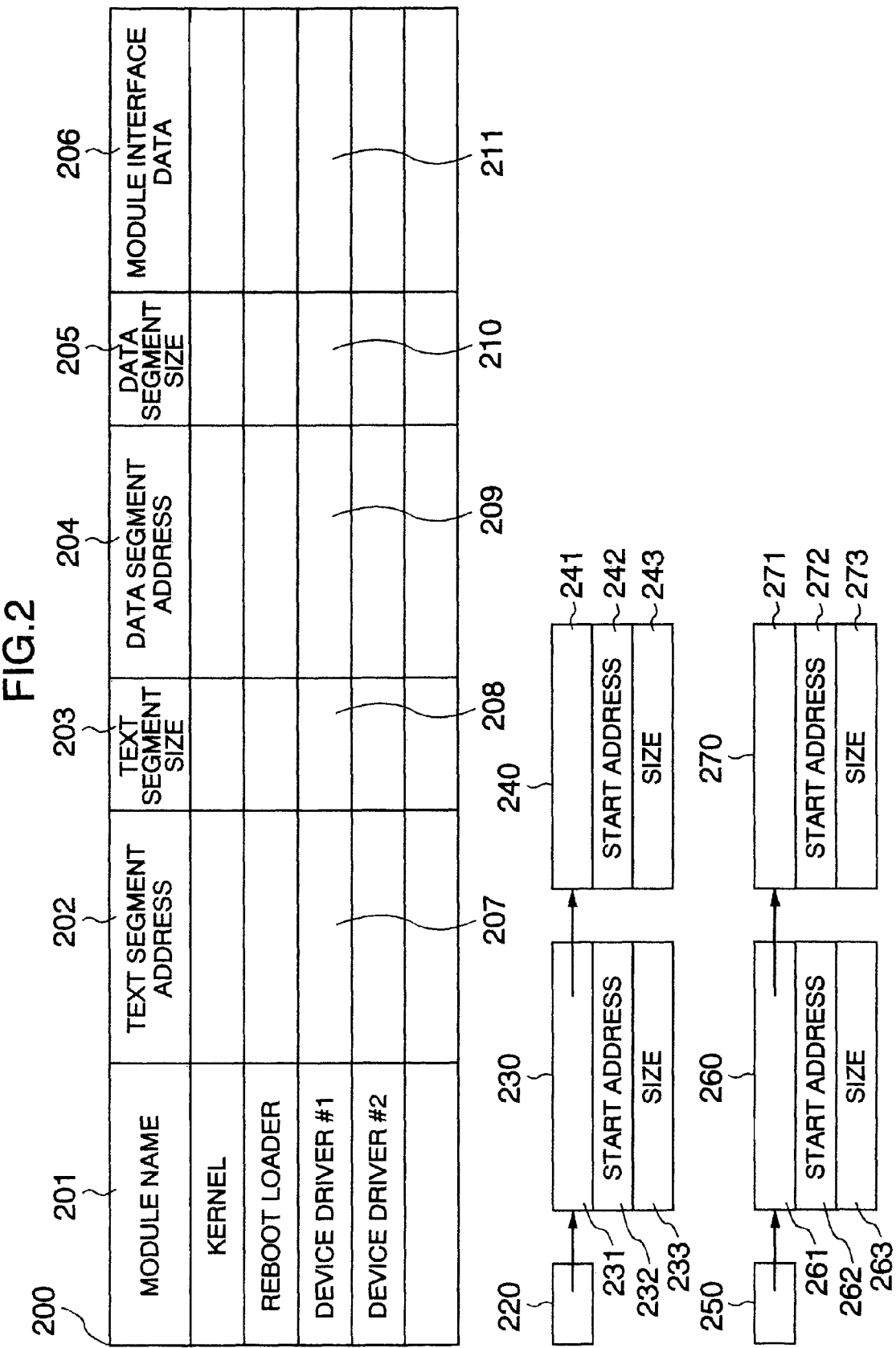
FIG. 2 is a view showing schematically a data structure for managing load modules and free spaces of memories in carrying out a method according to the present invention.

FIG. 2 shows a data structure for manifesting an address space of the kernel 111 of the operating system according to the present invention.

Referring to FIG. 2, reference numeral 200 denotes generally a load module manage table for recording the modules loaded in the address space of the kernel 111. Each of the modules is stored in the form of a file in the secondary storage such as the magnetic disk and can be loaded to the main memory by an operating system loader or by the kernel 111. The load module manage table 200 contains module names 201, text segment addresses 202, text segment sizes 203, data segment addresses 204, data segment sizes 205 and module interface data 206 of the individual modules, respectively, which are loaded in the main memory.

The module interface data 206 represents the begin or start addresses of interface routines which the modules as loaded can offer to the kernel 111. By registering the interface routines 206, the kernel 111 can make use of the function of the modules as loaded.

Stored in the fields 207 to 211 of the table shown in FIG. 2 are the text segment address, a text segment size, a data segment address, data segment size and the interface routine data, respectively, of a module named "device driver #1". In the load module manage table 200 shown in FIG. 2, it is assumed, by way of example, that the kernel 111, the reboot loader 113, the device driver #1 and the device driver #2 have been loaded in the kernel space.

In FIG. 2, reference numeral 220 denotes a kernel virtual space free region list which contains information indicating free regions in the virtual address space of the kernel 111. The kernel virtual space free region list 220 points to a free region structure 230 representing a free region. The free region structure 230 contains a free region address 232, free region size 233 and a pointer 231 to a succeeding free region structure 240 representing a succeeding free region. To this end, the pointer 231 contains the address of the succeeding free region structure 240. In the case of the kernel virtual space free region list 220 illustrated in FIG. 2, it is presumed, by way of example, that there exist in the virtual address space of the kernel 111 two free regions which start the from addresses 232 and 242, respectively, and which have free region sizes 233 and 243, respectively.

Further referring to FIG. 2, reference numeral 250 denotes a physical memory free region list for manifesting free regions in the physical memory. The physical memory free region list 250 is structured similarly to the kernel virtual space free region list 220. Free region structures 260 and 270 represent or manifest the free regions, respectively, in the physical memory. The physical memory free region list 250 shown in FIG. 2 indicates that two free regions exist in the physical memory as in the case of the kernel virtual space free region list 220.

Next, description will turn to a data structure for managing external devices connected to the computer.

Figure 3:
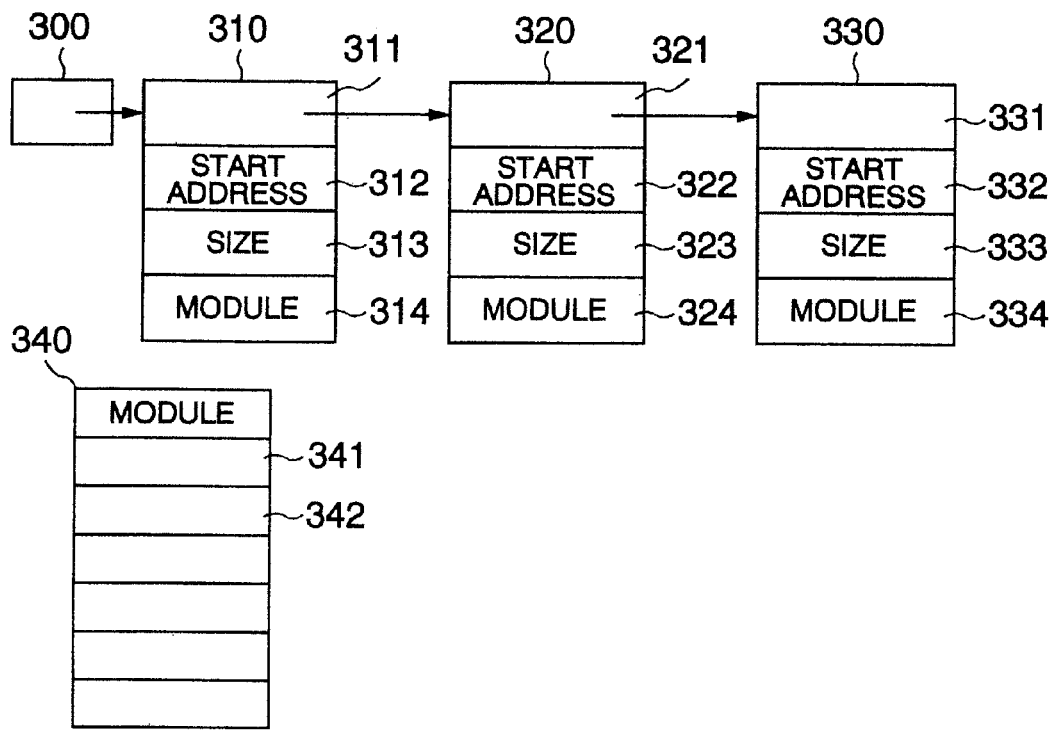
FIG. 3 is a view showing schematically a data structure for managing resources to be used by hardware or external devices connected to a computer in carrying out the method according to the present invention.

FIG. 3 shows a data structure manifesting resources destined for use by the external devices connected to the computer according to the present invention. In the figure, reference numeral 300 denotes a device address usage list indicating address ranges in which registers for controlling the external devices are resident. The device address usage list 300 is composed of device address usage structures each representing one address range. In the case of the device address usage list 300 shown in FIG. 3, it is comprised of three device address usage structures 310, 320 and 330. The device address usage structure 310 includes a device control register start address 312, size 313, a module identifying number 314 of the module which manages the device controlled with the address range and a link 311 for realizing the device address usage list 300.

The module identifying number 314 serves as an index for the load module manage table 200 shown in FIG. 2. By way of example, it is assumed that the device address usage structure 310 represents the resource used or occupied by an external device managed by the kernel 111. In that case, index "0" of the kernel 111 contained in the load module manage table 200 is set as the module identifying number 314. For the device managed by the device driver #1, if it exists, index "2" of the device driver #1 contained in the load module manage table 200 is set as the module identifying number. In this conjunction, it is presumed that index for the load module manage table 200 is counted incrementally, starting from "0".

Further referring to FIG. 3, reference numeral 340 denotes a device interrupt usage table designed for recording interrupt vectors (or identifiers) assigned to or used by the external devices, respectively. More specifically, the device interrupt usage table 340 serves to record which of the modules manages the hardware device using the interrupt vector recognized by the processor. By way of example, assuming that the clock interrupting device managed by the kernel 111 uses the interrupt vector or identifier "0", then the module identifying number "0" of the kernel 111 is placed at the zero-th entry 341 of the device interrupt usage table.

Figure 4:
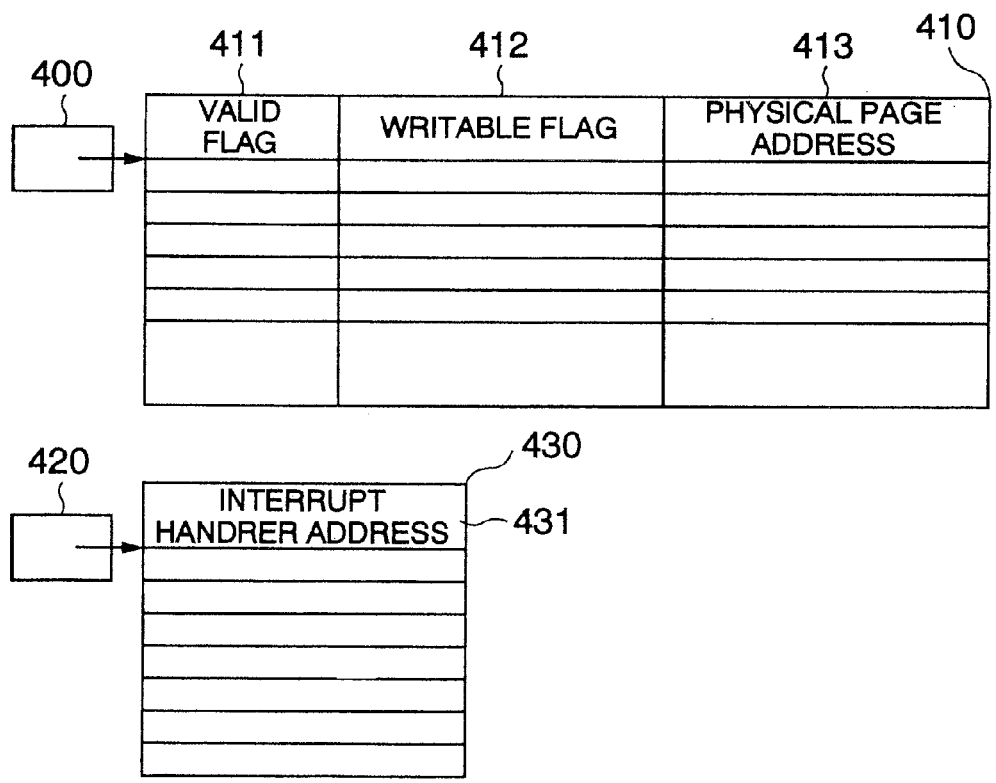
FIG. 4 is a view showing schematically data structures of a page table and an interrupt handler table which can be used in carrying out the method according to the present invention.

Next, description will turn to a data structure which is directly used by the processor. FIG. 4 shows data structures of an address translation table and an interrupt processing table used by the processor. In the figure, reference numeral 410 denotes a page table prescribing the address translation from the virtual address of the processor to the physical address thereof. The entry of the page table 410 exists for each page designated by the processor. Each of the entries contains for the relevant virtual page resident in the virtual address space a valid flag 411 indicating whether or not the entry of concern is valid, a writable flag 412 indicating whether or not the relevant page is writable, and a start address 413 of the physical page corresponding to the virtual page of the entry concerned.

The start address of the page table 410 is stored in a page table register 400 of the processor. When operating in the virtual addressing mode, the processor generates from the virtual address the physical address required for the actual memory access by consulting the page table register 400. Further, reference numeral 430 denotes an interrupt handler table prescribing the interrupt handler for each of the interrupt vectors for the interrupts issued to the processor, respectively. The interrupts are allocated with the interrupt vectors on the basis of the causes of the interrupts, respectively. The interrupt controller 104 receives an interrupt request and translates it to the interrupt vector which is then notified to the processor. Stored in the interrupt handler table 430 the start addresses of the interrupt handlers for the interrupt vectors, respectively. By way of example, when the zero-th interrupt (i.e., interrupt of the interrupt vector "0") is used for the clock interrupt, the address of the clock interrupt handler is stored at the zero-th entry 431 of the interrupt handler table.

The start address of the interrupt handler table 430 is stored in the interrupt handler table register 420 of the processor. Upon detection of the interrupt, the processor transfers the control to the interrupt handler in dependence on the cause of the interrupt by consulting the interrupt handler table register 420. For instance, it is assumed that the processor detects the clock interrupt, i.e., the zero-th interrupt. Then, the processor hands over the control to the handler placed at the zero-th entry 431 of the interrupt handler table 430 in accordance with the indication contained in the interrupt handler table register 420.

Now, description will be made of the data structure managed by the reboot loader 113. When the kernel 111 of the operating system is stopped due to software failure, the reboot loader 113 reboots the operating system by loading the kernel 111 of the operating system to the main memory for executing the kernel 111.

FIG. 5 shows a data structure managed by the reboot loader 113. In the figure, reference numeral 500 denotes a non-stop module manage table, which represents or manifests a data structure for managing the information or data of the non-stop modules which are so designed as to accept the interrupts from hardware device for executing the relevant processings even during the period in which the kernel 111 is reloaded and rebooted by the reboot loader 113. The non-stop module manage table 500 contains non-stop module names 501, text segment addresses 502 of the non-stop modules, text segment sizes 503, data segment addresses 504 and data segment sizes 505 of the non-stop modules, information 506 of the resources used by the external devices managed by the non-stop modules, and the addresses for the reinitialize routine of the non-stop modules, respectively.

Recorded or contained in the resource usage information 506 are the address used for the control of the external device managed by the non-stop module and the interrupt vector used to this end. On the other hand, the address of a routine executed upon rebooting of the kernel 111 is stored in the reinitialize routine 507. The contents of the processing executed by the reinitialize routine 507 depends on the hardware managed by the module. However, at least the registration of the interface routine 206 in the load module manage table 200 is effectuated. In this manner, the kernel 111 can resume the state capable of utilizing the functions offered by the non-stop module.

In the case of the non-stop module manage table 500 shown in FIG. 5, the reboot loader 113 and the device driver #1 are registered as the non-stop modules, respectively. Further stored at the entries 508 to 513 are the address used by the device driver #1, information of the external device and the reinitialize routine address, respectively. The reboot loader 113 makes use of the above-mentioned information contained in the non-stop module manage table 500 to structure the kernel space and the external device configuration information upon rebooting of the kernel 111 of the operating system, whereon the kernel space and the external device configuration information are handed over to the kernel 111, which can thus determine activation procedure by consulting the information mentioned above. In this manner, the interrupt originating in the external device can be processed without being suspended even during the period in which the kernel is being rebooted. The non-stop module manage table 500 is managed by the reboot loader module with the data structure placed in the data region of the reboot loader 113. The reboot loader module inhibits the data write in the data region of the reboot loader 113 in the initialization of the module for thereby protecting the non-stop module manage table 500 against detriment due to software failure. The write inhibition for the data region can be realized by resetting the writable flag contained in the page table 410 and corresponding to the virtual page containing the data region of concern.

Next, description will be directed to the format of the file which defines a load module to be fetched by the kernel 111 upon rebooting. FIG. 6 shows a data structure defining the load module. In the figure, reference numeral 110 denotes generally the module configuration file. The individual entries of the module configuration file 110 includes a module name 601 of the module loaded to the kernel 111, a file name 602 of the file in which the module is stored, and a flag 603 indicating whether or not the relevant module is the non-stop module. In the case of the instance illustrated in FIG. 6, the reboot loader 113, the device driver #1 and the device driver #2 are loaded into the main memory in this order by the kernel 111. The name of the file in which the device driver #1 is stored is "driver 1", which indicates that the device driver #1 is a non-stop module. The module configuration file 110 is stored in the file having the name determined in advance by the operating system so that the kernel 111 can find out this file without any appreciable difficulty.

FIG. 7 shows a format of a file in which the load module is stored. Referring to the figure, a file 700 storing the load module holds a text segment offset 701 indicating a location at which the text segment of the module for execution is stored, text segment size 702, a data segment offset 703 indicating a location where the data is stored, data segment size 704, an initialize routine offset 705 storing text segment of the module for execution, an initialize routine, a module relocate data offset 706, relocate data size 707, text 708 for execution and data 709.

The module relocate data 710 is made use of in loading the module to the main memory. More specifically, the relocate data 710 is used for altering or modifying the text of the module in accordance with the address at which the text of the module and the data region are loaded. By virtue of this feature, the configuration of the module to be loaded may change, being accompanied with corresponding change of the address at which the module is loaded.

Figure 8:
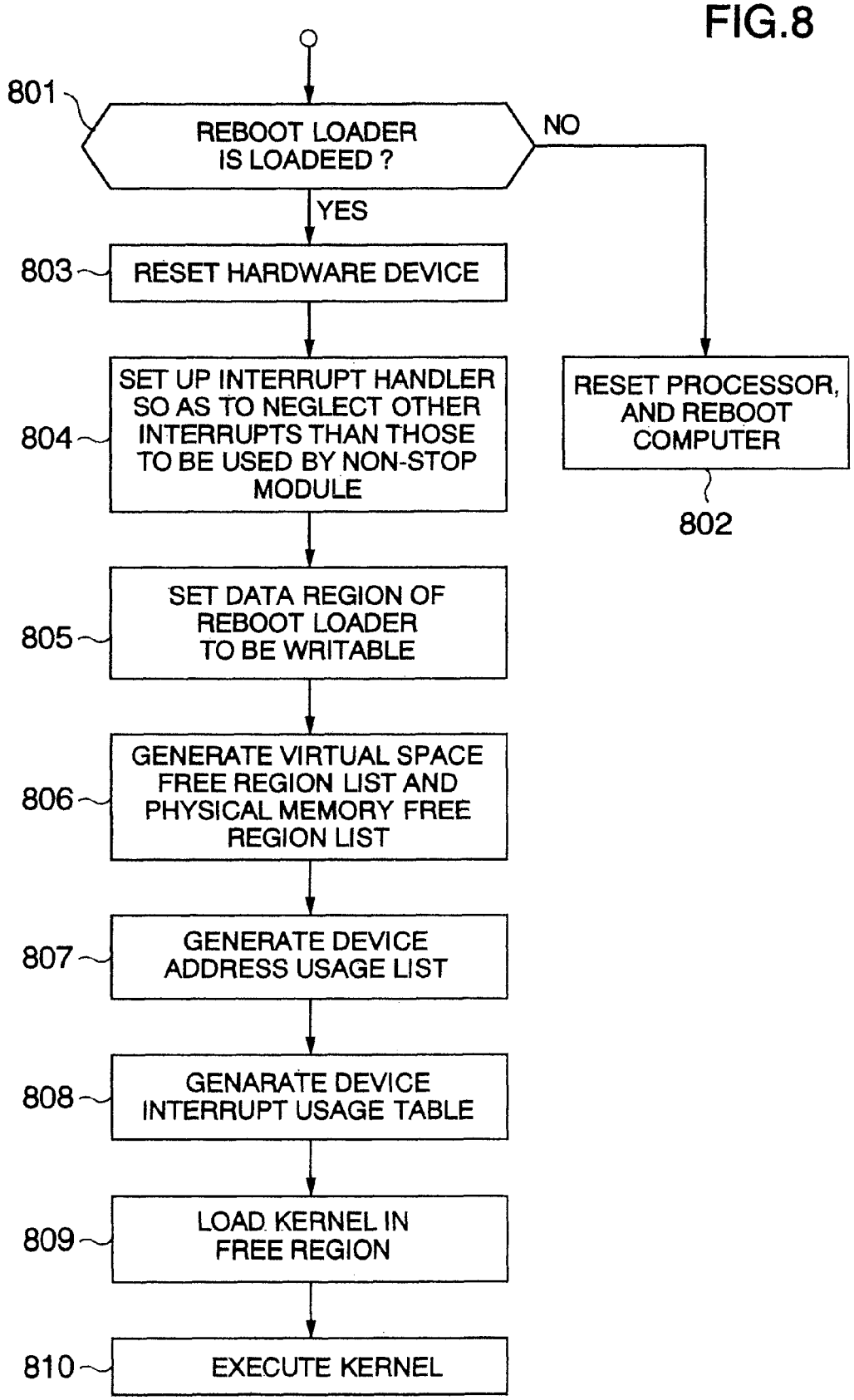
FIG. 8 is a flow chart for illustrating a processing procedure executed upon detection of software failure.

Now, description will turn to a procedure for rebooting the operating system according to the present invention. FIG. 8 is a flow chart showing a processing procedure of the reboot loader 113 executed upon rebooting of the operating system. At first, it is checked in a step 801 whether or not the reboot loader 113 has been loaded in the kernel space. Unless the reboot loader 113 has been loaded or when it can not be decided whether or not the reboot loader 113 is loaded, the processing proceeds to a step 802. In the step 802, the processor is reset to thereby execute the reboot of the computer.

In most of the conventional computers, when the processor is reset, the address translation is invalidated with the setting of the interrupt handler being also invalidated, whereupon the control is handed over to the physical address designated by the processor. Ordinarily, there is mapped to this physical address the read-only memory 103 which stores therein the starting or activating procedure of the computer. With this starting procedure, the hardware devices connected to the computer are reset. This is for the purpose of setting the external device to the known state for the execution of the kernel 111 of the operating system. Because of this starting procedure and because of the processor being reset among others, it is impossible in the conventional computers to accept the interrupt processing from the external devices during the rebooting of the operating system.

On the other hand, when decision is made in the step 801 that the reboot loader 113 has been loaded, the processing proceeds to a step 803 without resetting the processor. The processing executed actually by the reboot loader 113 is started from this step 803. More specifically, in the step 803, it is checked whether the module registered in the load module manage table 200 incorporates the hardware reset routine. If so, the hardware reset routine is called. Parenthetically, for the device for which any especial hardware reset is required, the reset routine need not be registered.

In a succeeding step 804, the interrupt handlers for those of the interrupts which are not accepted by the non-stop modules are invalidated by consulting the resource usage information 506 contained in the non-stop module manage table 500. To this end, the entries of the interrupt handler table 430 are set at the addresses of only those interrupt handlers that can accept the interrupt. In a next step 805, the page stored in the data region of the reboot loader is set to be writable in preparation for the data storage to the data region of the non-stop module. In more concrete, the writable flag 412 for the entry of the page table 410 which corresponds to the data region of the reboot loader is set to the writable state.

In a step 806, the virtual space free region list and the physical memory free region list are generated. More specifically, in the step 806, a free region list containing as free regions the other address regions than those used by the non-stop modules, the reboot loader 113 and the kernel stack 116 is generated in the data region of the reboot loader 113 by consulting to the non-stop module manage table 500. The free region list has the same data structure as the kernel virtual space free region list 220 and the physical memory free region list 250.

In a step 807, the device address usage list is generated. More specifically, in the step 807, the device address usage list in which the other address ranges than those used by the non-stop module are set as the free region is generated within the data region of the reboot loader 113 by consulting the non-stop module manage table 500, as in the case of the step 806. The device address usage list as generated has a substantially same data structure as the device address usage list 300 managed by the operating system except that in place of the module identifying numbers in the device address usage structure, the module names are stored.

In a step 808, the device interrupt usage table is generated. Similarly to the processing in the step 807, the device interrupt usage table in which the other interrupt vectors than those used by the non-stop modules are set as being unused or virgin is generated in the data region of the reboot loader 113. In that case, instead of the module identifying numbers, the module names are placed at the individual entries of the device interrupt usage table, as described hereinbefore in conjunction with the step 807. The data structures generated in the steps 806 to 808 serve for the purpose of preventing the hardware device resource managed by the non-stop module from being erroneously allocated to the other modules upon rebooting of the kernel 111.

Finally, the reboot loader 113 loads the kernel 111 of the operating system in the main memory (step 809), and the kernel 111 is executed with the address of the reinitialize routine of the reboot loader 113 being used as additional parameter (step 810).

Figure 9:
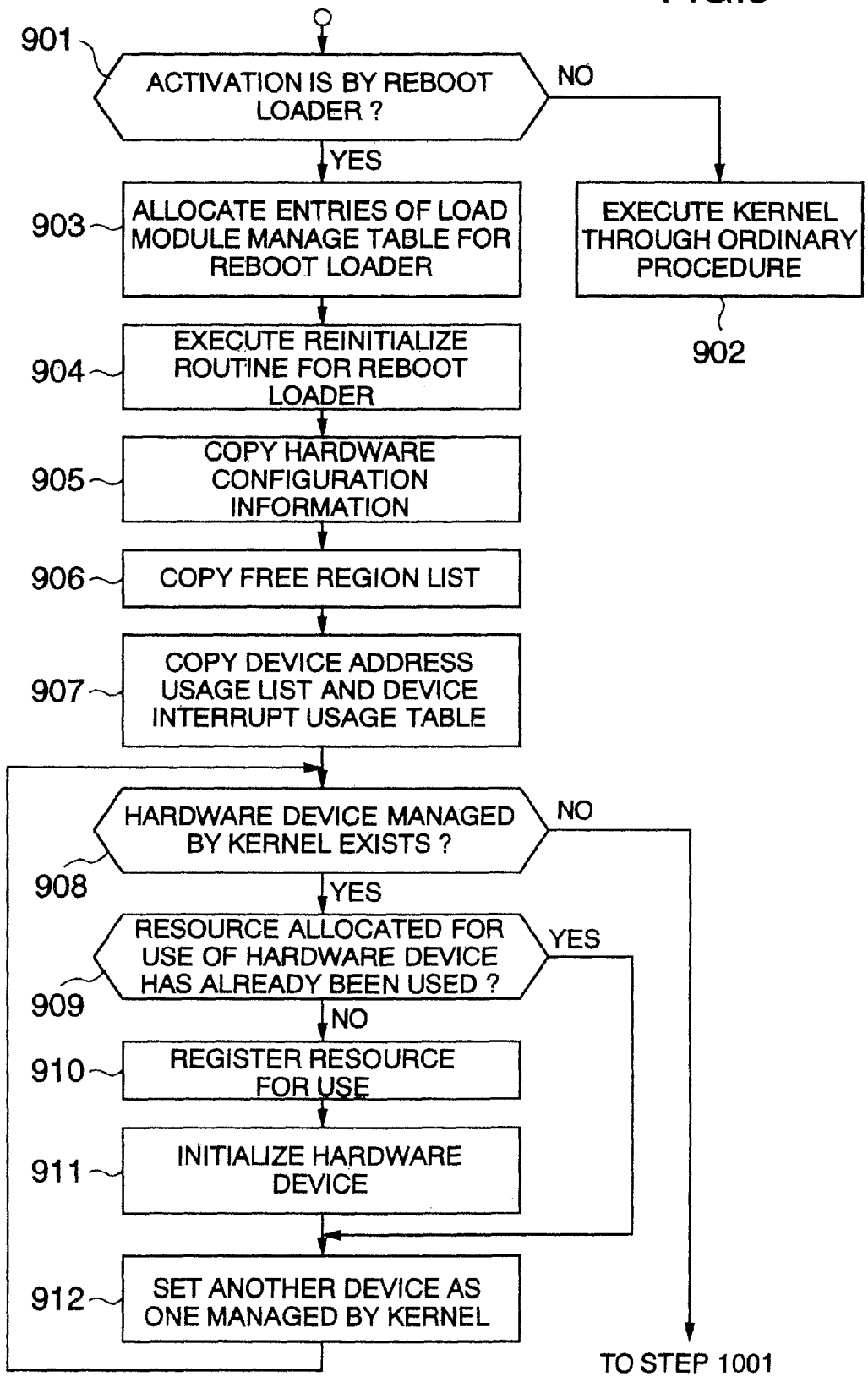
FIG. 9 is a first flow chart for illustrating an operating system reboot processing according to a first embodiment of the invention.

FIG. 9 is a flow chart showing an initialize processing procedure of the kernel 111 of the operating system according to the first embodiment of the invention.

At first, upon starting, the kernel 111 discriminatively determines whether the start is activated by the reboot loader 113 or through the ordinary starting procedure (step 901). Such discriminative determination can easily be made because in the case of the starting by the reboot loader 113, the address of the reinitialize routine of the reboot loader 113 is transferred to the kernel 111 as the parameter.

Unless the start is made by the reboot loader 113, execution of the kernel 111 through the ordinary procedure is carried out (step 902). The ordinary procedure includes initialization of the bus and the interrupt controller, initialization of the hardware device managed by the kernel, loading of the modules described in the module configuration file to the main memory and initialization thereof, and execution of the initial process.

In the case of the starting by the reboot loader 113, the processing proceeds to a step 903. In this step 903, entries of the load module manage table 200 are allocated for the reboot loader module. In a succeeding step 904, reinitialize routine is executed on the basis of the address of the reinitialize routine for the reboot loader module transferred as the parameter. Through the reinitialize routine for the reboot loader 113, the processing similar to the reinitialize routine for the non-stop module is carried out. Through this reinitialize routine, the load module manage table 200 is set up. In particular, the module interface 206 for the load module manage table 200 is established. Thus, the kernel 111 can call the interface routine offered by the reinitialize routine.

In a succeeding step 905, the hardware configuration information is copied. Further, in steps 906 and 907, the free region list, the device address usage list and the device interrupt usage table structured by the reboot loader 113 before activation of the kernel 111 are copied to the data space of the kernel 111. These processings are executed by the interface routine offered by the reboot loader 113.

In the case of the ordinary start, there are generated a free region list containing as the free region the memory region exclusive of the region in which the kernel 111 has been loaded, a free device address usage list and a device interrupt usage table whose entries for all the interrupts are virgin, whereon the subsequent processings are executed.

By contrast, in case the kernel is rebooted by the reboot loader 113, the free region list, the device address usage list and the device interrupt usage table are made use of. In this manner, continuity of the processing relating to the external device as executed by the non-stop module can be sustained while avoiding the initialization of the data region of the non-stop module as well as the initialization of the external devices.

In succeeding steps 908 to 912, initialize processing is performed for all the external devices except for the bus and the interrupt controller which are under management of the kernel 111. At first in the step 908, decision is made as to whether or not there exists any hardware device managed by the kernel 111. When this decision results in negation "No", the processing proceeds to a step 1001. In the step 909, it is checked whether or not the address region and the interrupt vectors to be allocated for use of the external devices have already been used or occupied. If the addresses and the interrupt vectors allocated for use of the external device undergoing the initialize processing have already been registered in the device address usage list 300 and the device interrupt usage table 340, the steps 910 and 911 are skipped, and thus the processing proceeds to the step 912. Registration of the address and the interrupt vector allocated for the use of the external device undergoing the initialize processing in the device address usage list 300 and the device interrupt usage table 340, respectively, means that the external device mentioned above is being used by the non-stop module. Thus, the continuity of the processings relating to the devices as executed by the non-stop module can be maintained while evading the initialization of the external device managed by the non-stop module.

In case the address region and the interrupt vector allocated for use of the external device are unused, the address region and the interrupt vector are registered in the device address usage list 300 and the device interrupt usage table 340 together with the module identifying number assigned to the kernel 111 (step 910).

The module identifying number of the kernel 111 is made available from the load module manage table 200. Furthermore, the initialization of the external device of concern is performed (step 911), and the processing proceeds to the step 912. In the step 912, another device is set as the device to be subjected to the processing, whereon the step 908 is executed. If there remains no device to undergo the processing, the procedure proceeds to a step 1001 from the step 908.

Figure 10:
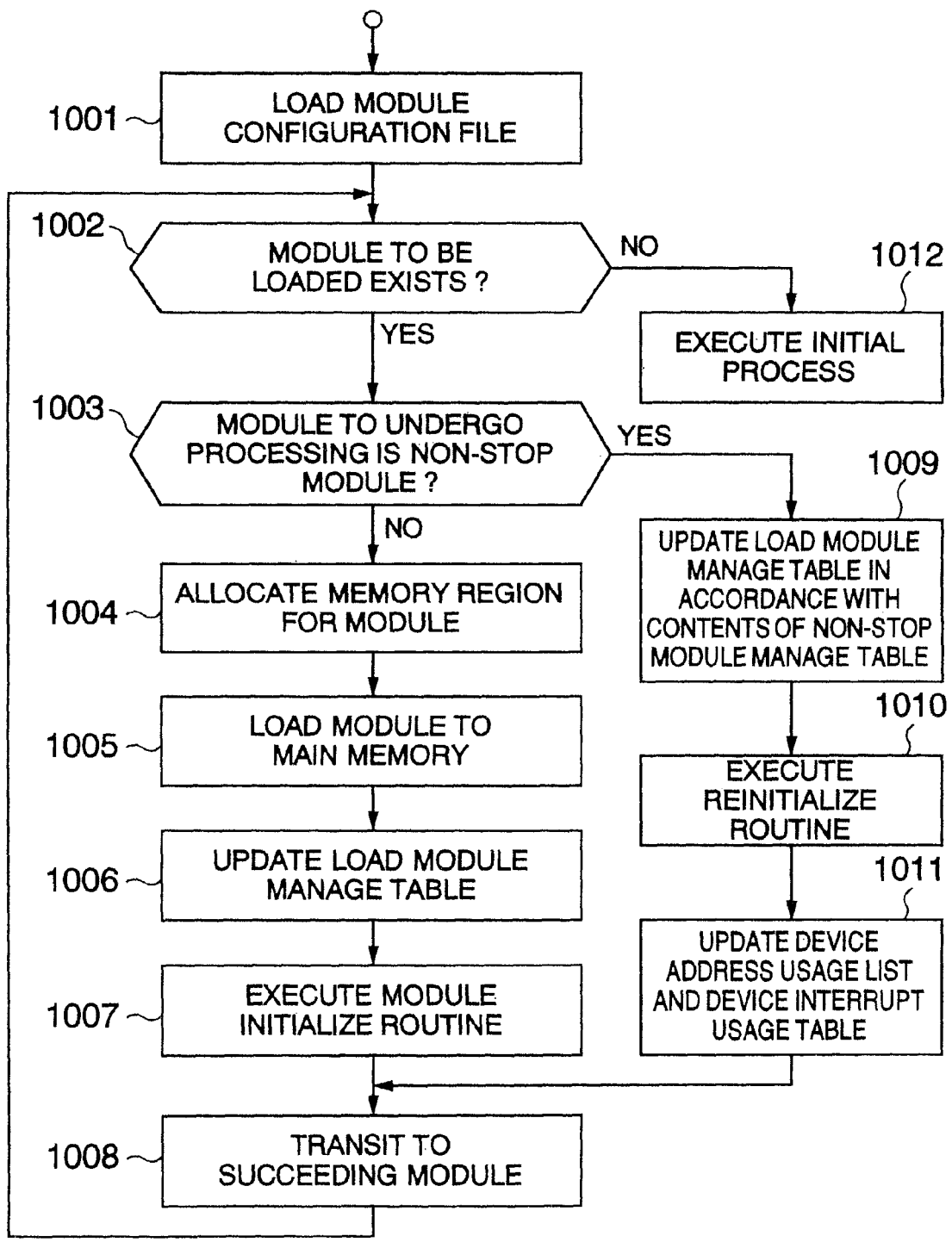
FIG. 10 is a second flow chart for illustrating the operating system reboot processing according to the first embodiment of the invention.

FIG. 10 is a flow chart illustrating the processing which follows the above-mentioned step 1001. The processing shown in FIG. 10 is mainly concerned with the module load processing.

In the step 1001, the module configuration file 110 is loaded to the memory. Processings in the succeeding steps 1002 to 1011 are executed for the individual modules registered in the module configuration file. Loop is so implemented through the steps 1002 to 1008 that the processing can be executed on a module-by-module basis.

In the first step 1003 within the loop, it is checked by consulting the non-stop module flag 603 contained in the module configuration file 110 whether or not the module to undergo the processing is a non-stop module. If not, the processing proceeds to the step 1004.

Through the processing starting from the step 104, loading of the module to the main memory is carried out. At first, in the step 1004, the memory region as demanded is acquired, which can be realized by searching a free region of a sufficient capacity for storing the module by consulting the kernel virtual space free region list 220 and the physical memory free region list 250 and by extracting the free memory region as found from these free region lists. The memory region required for the storage of the module can be determined by referencing the leading parts 702 and 704 (text segment size and the data segment size) of the file storing the module. In conjunction with the memory allocation mentioned above, the page table 410 is also set up. More specifically, for each of the entries of the page table 410 which corresponds to the address region as allocated, the valid flag 411 is set while the leading address of the physical page as allocated is placed at the physical page start address 413. Further, the writable flag 412 is set as well. The writable flag 412 for the page storing the text segment is reset after the loading of the text segment.

In the succeeding step 1005, the file designated by the file name 602 contained in the module configuration file 110 is loaded to the memory region acquired in the step 1004. After the loading, the text segment is modified by using the relocate data offset 706, the relocate data size 707 and the relocate data 710 contained in the file. Additionally, the entry for the module undergoing the processing is allocated to the load module manage table 200, whereon the address of the entry and the size thereof are set up (step 1006).

Subsequently, the module initialize routine is executed (step 1007). Through the module initialize routine, at least the module interface 206 for the load module manage table 200 is established. If there exists the initialize processing required for other module, the initialize processing is executed as well. When the module interface 206 is established, the kernel 111 can know the address of the processing routine offered by the module. Thus, the kernel 111 is now in the state capable of executing the processing offered by the module.

In the succeeding step 1008, the processing-subjected module is placed as the entry in a next module configuration file, whereon the step 1002 is resumed. Now, description will be directed to the case where the processing-subjected module is a non-stop module. When it is decided in the step 1003 that the processing-subjected module is a non-stop module, the processing proceeds to the step 1009 where the update processing is performed for the load module manage table 200. At first, entries for storing data of the module being processed are allocated to the load module manage table 200. The text segment address 202, the text segment size 203, the data segment address 204 and the data segment size 205 of the load module manage table 200 to be stored at the entries as allocated can be found in the non-stop module manage table 500 resident within the data region of the reboot loader 113 as the text segment address 502, the text segment size 503, the data segment address 504 and the data segment size 505, respectively. Thus, by copying the text segment address 502, the text segment size 503, the data segment address 504 and the data segment size 505 to the allocated entries, updating of the load module manage table 200 can be accomplished.

In succession, reinitialize routine for the non-stop module is executed (step 1010). The address of this reinitialize routine is stored in the reinitialize routine 507 of the non-stop module manage table 500. Thus, the reinitialize routine is made available with the name of the non-stop module. Through the reinitialize routine of the non-stop module, at least the interface routine 206 for the load module manage table 200 is established. Other processing such as set-up of the hardware device may be carried out, as occasion requires. In that case, because the non-stop module can not be newly loaded, the data region is reserved intactly. Thus, continuity of the processing relating to the device as executed by the non-stop module can be sustained.

In a succeeding step 1011, the entry number of the load module manage table 200 as acquired in the step 1009 is stored in the module identifying number columns of the entries manifesting the address region and the interrupt vector managed by the non-stop module subjected to the processing in the device address usage list 300 as well as the device interrupt usage table 340. The device address region and the interrupt vector managed by the non-stop module are available from the resource usage information 506 contained in the non-stop module manage table 500. There arises no necessity of executing any particular processings for the kernel virtual space free region list 220 and the physical memory free region list 250 because the address region where the non-stop module is resident has been taken out from the free region list by the reboot loader 113 as described hereinbefore. Subsequently, the processing proceeds to the step 1008 to perform the processing for the succeeding load module.

When it is decided in the step 1002 that all the modules have been loaded, then the processing proceeds to a step 1012. In this step 1012, initial process is generated and executed, whereupon the procedure for activating the operating system comes to an end.

Figure 11:
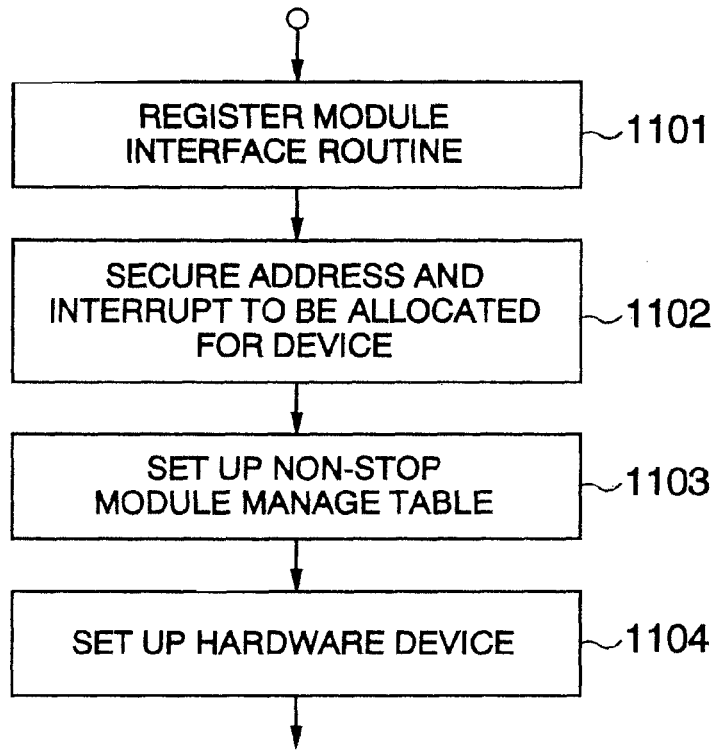
FIG. 11 is a flow chart for illustrating an initialize procedure for a non-stop module according to the first embodiment of the invention.

Now, description will turn to the initialize routine of the non-stop module. The module initialize routine is the routine which must be incorporated in all the modules. The module initialize routine is executed upon starting of the kernel 111. FIG. 11 is a flow chart showing processing steps in the initialize routine for the non-stop module according to the instant embodiment of the invention. The description which follows is directed to the processings included in the initialize routine for the device driver #1 set in the module configuration file 110.

At first, the module interface serving as the interface for the device driver #1 to the kernel 111 is placed at an entry 211 allocated to the device driver #1 contained in the load module manage table 200.

In a succeeding step 1102, the text segment address, the size thereof and the module identifying numbers are placed in the device address usage structure for the device driver #1 and added to the device address usage list 300. Further, the module identifying number of the device driver #1 is placed at the entry for the interrupt vector of the device interrupt usage table 340 as managed by the device driver #1. In this way, the device address region and the interrupt vector to be used by the device driver #1 are registered in the device address usage list 300 and the device interrupt usage table 340, respectively.

Subsequently, registration of the modules to the non-stop module manage table 500 is performed (step 1103). To this end, the entries for the module which is currently processed are allocated to the non-stop module manage table, whereon the address, the size information, and the resource usage information as well as the address of the reinitialize routine are set, which can be realized by the interface routine offered by the reboot loader 113. When the non-stop module manage table 500 is updated, the writable flags contained in the page table 410 are manipulated in precedence to or in succession to the updating because the page on which the non-stop module manage table 500 is resident is inhibited in respect to the write operation. Thereafter, the hardware device is set up.

Next, description will be made of the interface routine offered by the reboot loader 113. In this conjunction, it is noted that the reboot loader 113 itself is a non-stop module and can afford the initialize routine, the reinitialize routine, the hardware configuration data copy routine and the non-stop module registration routine.

Figure 12:
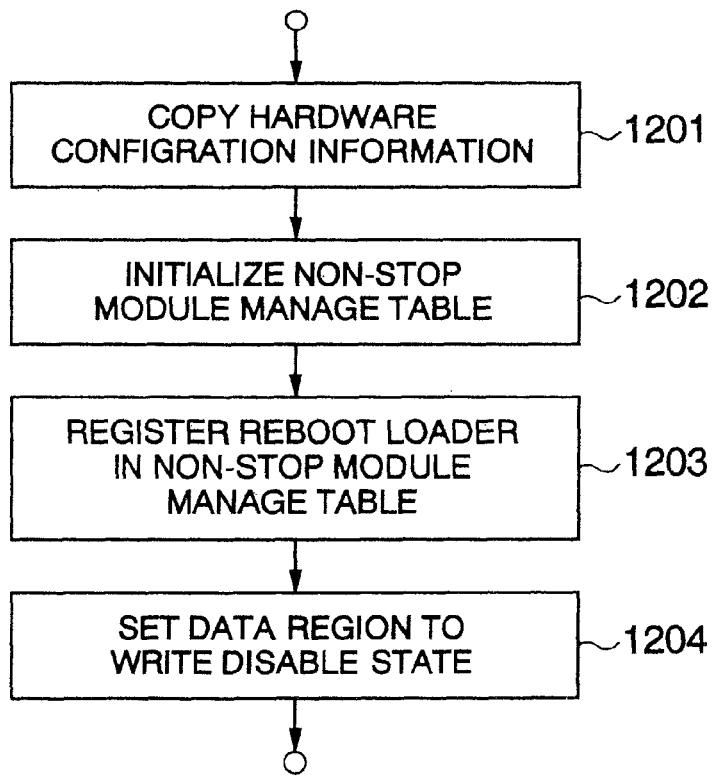
FIG. 12 is a flow chart for illustrating a processing procedure for a reboot loader.

In the first place, description will be directed to the processings involved in the initialize routine for the reboot loader 113. FIG. 12 is a flow chart illustrating a processing procedure for the reboot loader 113.

As mentioned above, the reboot loader 113 is a non-stop module, and the initialize routine for the reboot loader 113 is called only upon starting of the computer. In the initialize routine for the reboot loader 113, the hardware configuration information or data generated by an initialize program stored in the read-only memory 103 is copied to the data region of the reboot loader 113 in preparation for the succeeding reboot processing (step 1201). In succession, initialization of the non-stop module manage table 500 (step 1202) and registration of the reboot loader 113 itself to the non-stop module manage table (step 1203) are effectuated. Finally, the non-stop module manage table and the page allocated to the data region of the reboot loader 113 where the hardware configuration data is stored are set to the write disable state (step 1204).

The reinitialize routine serves for registration processing of the interface routine for the load module manage table, similarly to the reinitialize routines for the other non-stop modules. Through the hardware configuration data copying routine, the hardware configuration data stored in the data region of the reboot loader 113 is copied to the data region of the kernel 111. On the other hand, the non-stop module registration routine serves to register the data concerning the non-stop module in the non-stop module manage table 500. Usually, the data region of the reboot loader 113 is set to the write disable state by the virtual address mechanism. Accordingly, with the registration routine, the write disable state is once cleared and then the non-stop module data are written in the non-stop module manage table 500, whereupon the data region is again set to the write disable state.

According to the teachings of the invention incarnated in the instant embodiment thereof, the processing for the interrupt issued by the external device(s) registered as being usable by the non-stop module can be carried out continuously without interruption even when the reboot processing is being carried out after the stoppage of the kernel 111 of the operating system due to software failure.

Description will now be directed to a mode for carrying out the invention in which the module in charge of controlling the external devices is set as the non-stop module in response to the clock interrupt. Ordinarily, the clock interrupt is managed by the kernel 111 itself. In conjunction with the timing-critical processing, it is noted that such scheme is known that a module designed for performing the timing-critical processing with high priority by snatching the clock interrupt before it is handed over to the kernel 111. With the expression "snatching of the interrupt", it is intended to mean that the set state of the interrupt handler is altered. In the timing-critical control as mentioned above, there may arise such situation that interception of the processing for the clock interrupt can not be admitted in addition to the severe temporal restriction or limitation.

According to the teachings of the invention incarnated in the illustrated embodiment, the processing for the clock interrupt can be continued without being suspended even when the kernel 111 is rebooted after being stopped due to occurrence of software failure, because the module which snaches the clock interrupt is set as the non-stop module.

To this end, upon registration of the clock interrupt processing module as the non-stop module, the interrupt vector of the relevant clock interrupt and the clock interrupt control address are registered in the non-stop module manage table 500 as the resource allocated to or used by the module, i.e., as the device, to say in another way. Thus, clock interrupt processing environment can be sustained before and after the rebooting of the kernel 111. Further, upon the rebooting of the kernel 111, the latter can recognize that the clock interrupt for which the kernel 111 itself serves as the managing device is used by the other module and effectuate the reboot processing without altering the setting concerning the clock interrupt.

As is apparent from the foregoing, according to the invention incarnated in the first embodiment, there can be realized a control system of high reliability and enhanced real-time performance which can sustain the clock interrupt processing continuously even when the kernel 111 of the operating system is rebooted after the stop due to software failure.

Embodiment 2

A second embodiment of the present invention will be described.

Figure 13:
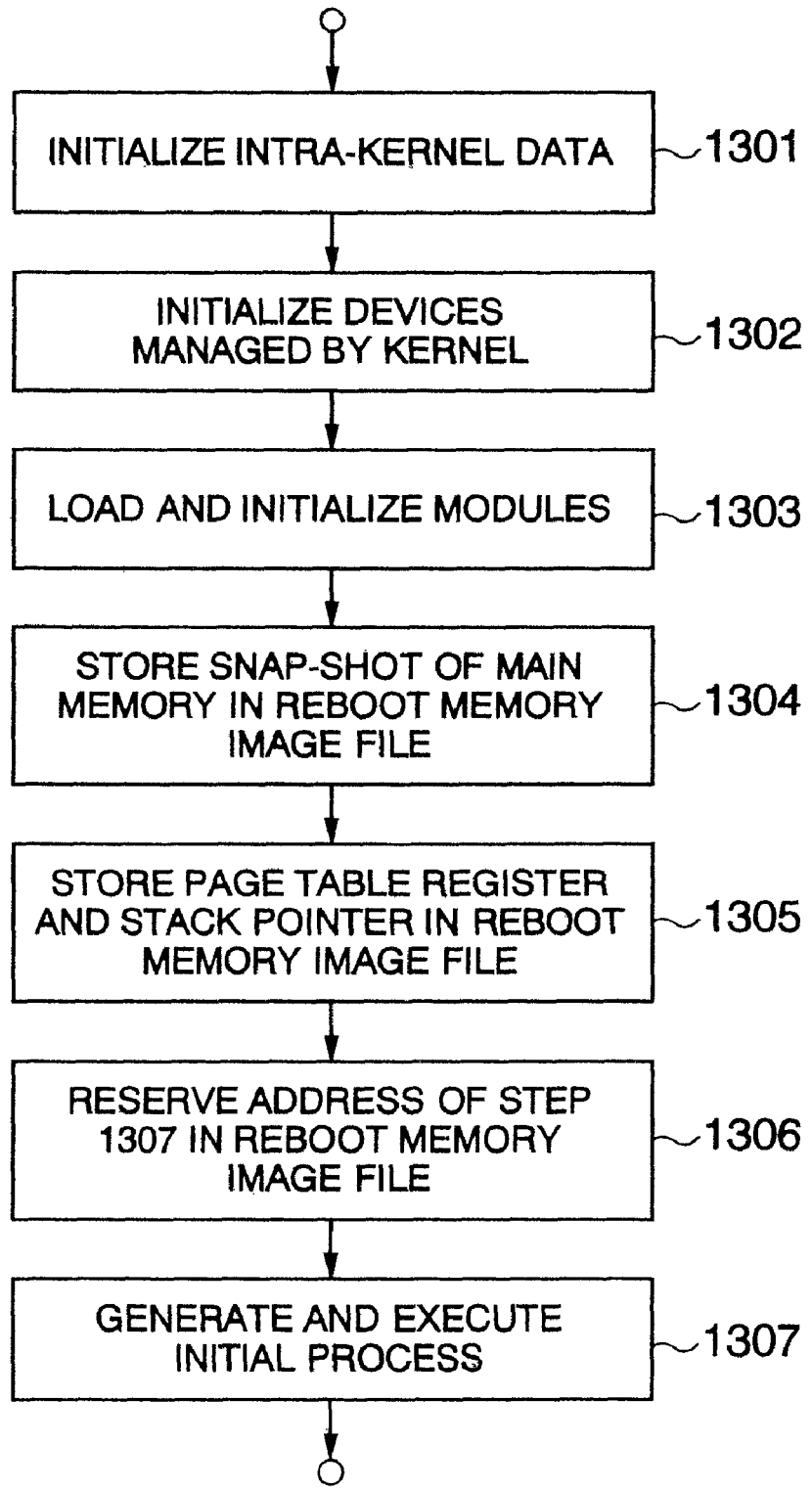
FIG. 13 is a flow chart for illustrating a computer starting or activating procedure according to a second embodiment of the present invention.

FIG. 13 is a flow chart showing a computer activating procedure according to the second embodiment of the invention.

Referring to the figure, initialization of the kernel data, initialization of the external device and the loading/initialization of the kernel module which are the ordinary kernel initialize processings are carried out in steps 1301, 1302 and 1303, respectively. The initialization of the module can be realized by registering the address allocated to or used by that module in the non-stop module manage table 500 in case the module is a non-stop module, as described hereinbefore in conjunction with the first embodiment of the invention.

In a succeeding step 1304, the region of the main memory 102 in which the kernel 111 and the other modules are loaded, exclusive of the data region of the non-stop module, is recorded on the reboot memory image file stored in the magnetic disk 105. Further, in a step 1305, the page table register and the stack pointer value of the kernel stack are reserved in the reboot memory image file. In a step 1306, the address of a succeeding step 1307 is reserved in the reboot memory image file stored in the magnetic disk 105 serving as secondary storage.

The reboot memory image file generated in this manner is made use of in restructuring the software configuration of the kernel 111 upon rebooting thereof after the stop due to software failure. Incidentally, in the step 1307, initial process is generated and executed.

Figure 14:
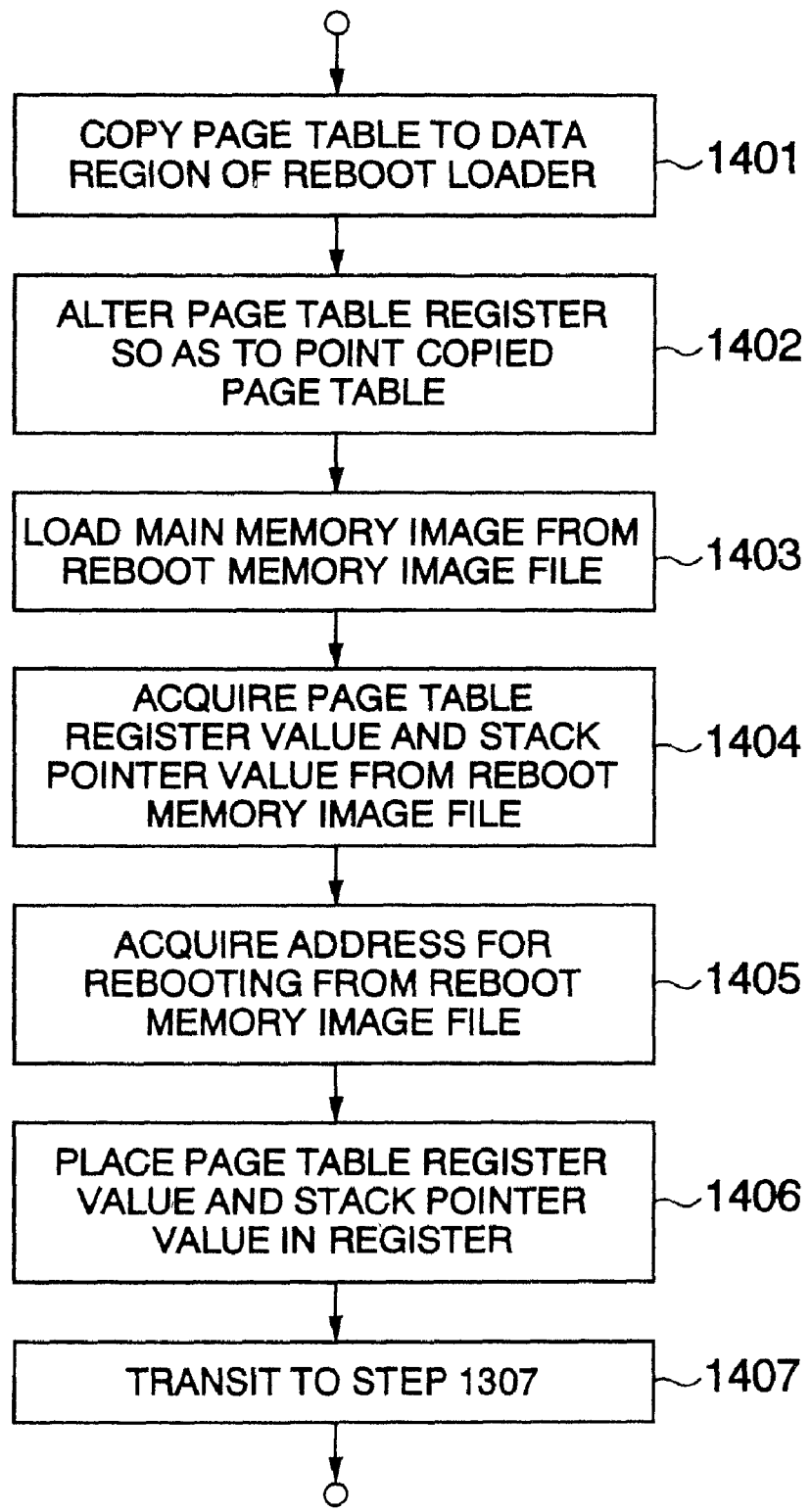
FIG. 14 is a flow chart for illustrating a reboot procedure for the operating system of a computer according to the second embodiment of the present invention.

FIG. 14 is a flow chart showing a reboot procedure of the kernel 111 of the operating system according to the second embodiment of the present invention.

The rebooting procedure is carried out by the reboot loader 113 registered as the non-stop module. The reboot procedure now of concern will be described by referring to the figure. At first, the page table 410 pointed by the page table register 400 is copied to the data region of the reboot loader 113 (step 1401), whereon the page table register 400 is so altered as to point the copied page table (step 1402).

Subsequently, the contents of the main memory 102 at the time of the reboot of the kernel as recorded in the reboot memory image file stored in the secondary memory or magnetic disk 105 are copied to the main memory 102 (step 1403). In succession, the page table register and the stack pointer as well as the address for a succeeding processing step 1307 is acquired from the reboot memory image file stored in the magnetic disk 105 (steps 1404 and 1405). In a succeeding step 1406, the page register value and the stack pointer value as acquired are set in relevant registers, respectively, whereupon the processing proceeds to the step 1307.

In the system according to the second embodiment of the invention, the data region of the non-stop module is reserved in the main memory 102 upon rebooting of a kernel because the reboot memory image file stored in the magnetic disk 10.5 does not contain the data region of the module registered as the non-stop module. Thus, the continuity of the external interrupt processing executed by the non-stop module can be sustained. Although it has been assumed in the foregoing that the content of the main memory 102 is reserved in the secondary storage or magnetic disk 105, it can be saved in the other region of the main memory.

Furthermore, when the kernel 111 detects occurrence of the software failure, the processing executed by the kernel 111 may be suspended without resetting the processor while maintaining the contents of the main memory used for the interrupt processing with the setting of the interrupt handler being held in the main memory so that the processing for particular or predetermined interrupt(s) can be executed even during the rebooting of the kernel.

Upon rebooting of the kernel 111 of operating system in succession to occurrence of software failure, it is possible to continue execution of the processing for the interrupt issued by a particular or predetermined external device without being suspended by virtue of the provision of the procedures for initializing the external device and determining the structure of the module to be loaded, respectively, by referencing the non-stop module manage table 500.

Moreover, the processing for checking the hardware configuration executed upon resetting of the processor can be avoided with the time taken for the operating system to be rebooted being shortened by virtue of the arrangement that the operating system is rebooted without resetting the processor.

Many modifications and variations of the present invention are possible in the light of the above techniques. It is therefore to be understood that within the scope of the appended claims, the invention may be practiced otherwise than as specifically described.

What is claimed is:

1. A computer, comprising:
a processor; and
a memory,
wherein said processor decides whether a module is a non-stop module which is to be under execution throughout rebooting of said computer, said processor stores data assigned for modules other than said non-stop module,
wherein, when said processor receives an interrupt executable for said non-stop module during rebooting of said computer, said processor executes said non-stop module, and
wherein said processor reads said data to load said modules other than said non-stop module to reboot said computer.

2. A computer according to claim 1, wherein said non-stop module decided by said processor includes a module controlling to reboot said computer.

3. A computer according to claim 2, wherein said processor stores said data assigned for said modules other than said non-stop module into an area other than said area of said memory for said non-stop module.

4. A computer according to claim 3, wherein said interrupt is from an other computer connected to said computer, and
wherein said non-stop module includes a device driver for an interrupt from said other computer.

5. A computer according to claim 3, wherein said interrupt is based on a clock in said computer.

6. A computer according to claim 5, wherein said modules other than said non-stop module are included in a kernel of an operating system executed by said processor.

7. A computer according to claim 6, wherein said computer is rebooted at a software failure of a program executed by said program.

8. A computer, comprising:
a processor; and
a memory,
wherein said processor decides a non-stop module which is to be under execution throughout rebooting of said computer, and manifests a region of said memory assigned for modules other than said non-stop module as a free region,
wherein, when said processor receives an interrupt executable for said non-stop module during rebooting of said computer, said processor executes said non-stop module, and
wherein said processor reads said modules other than said non-stop module into said free region to load said modules other than said non-stop module to reboot said computer.

9. A computer according to claim 8, wherein said non-stop module decided by said processor includes a module controlling to reboot said computer.

10. A computer according to claim 9, wherein said processor stores said data assigned for said modules other than said non-stop module into an area other than said area of said memory for said non-stop module.

11. A computer according to claim 9, wherein said interrupt is based on a clock in said computer.

12. A computer according to claim 11, wherein said modules other than said non-stop module are included in a kernel of an operating system executed by said processor.

13. A computer according to claim 12, wherein said computer is rebooted at a software failure of a program executed by said program.

14. A computer, comprising:
- a processor;
- a memory;
- a storage apparatus;
- an external device; and
- an interrupt controller, wherein when said processor decides a non-stop module which is to be under execution throughout rebooting of said computer, and stores data assigned for modules other than said non-stop module, wherein, when said interrupt controller receives an interrupt executable for said non-stop module during rebooting of said computer, said interrupt controller notifies said processor, wherein said processor executes said non-stop module to respond to said interrupt, and wherein said processor reads said data from said storage apparatus to load said modules other than said non-stop module to reboot said computer.

* * * * *